United States Patent
Wang et al.

(10) Patent No.: US 6,624,564 B2
(45) Date of Patent: Sep. 23, 2003

(54) ANTISTATIC/ANTIREFLECTIVE COATING FOR VIDEO DISPLAY SCREEN WITH ADJUSTABLE LIGHT TRANSMISSION

(75) Inventors: Kuo-Chu Wang, Taipei (TW); Chun-Min Hu, Keelung (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 211 days.

(21) Appl. No.: 09/866,417

(22) Filed: May 25, 2001

(65) Prior Publication Data

US 2002/0175615 A1 Nov. 28, 2002

(51) Int. Cl.[7] .......................... H01J 31/00; H01J 29/10
(52) U.S. Cl. ..................... 313/479; 313/478; 313/473; 313/480
(58) Field of Search ................. 313/478, 479, 313/461, 473, 480, 112, 114, 116

(56) References Cited

U.S. PATENT DOCUMENTS

| | | | | |
|---|---|---|---|---|
| 3,635,751 A | * | 1/1972 | Long et al. ............... | 220/2.1 A |
| 4,945,282 A | * | 7/1990 | Kawamura et al. ......... | 313/479 |
| 5,446,339 A | * | 8/1995 | Kinoshita et al. ........... | 313/478 |
| 5,523,649 A | * | 6/1996 | Tong et al. ................. | 313/479 |
| 5,998,919 A | * | 12/1999 | Yoo et al. .................. | 313/479 |
| 6,356,012 B1 | * | 3/2002 | Bae ............................ | 313/479 |

* cited by examiner

Primary Examiner—Nimeshkumar D. Patel
Assistant Examiner—Anthony Perry
(74) Attorney, Agent, or Firm—Emrich & Dithmar

(57) ABSTRACT

For use in a color cathode ray tube (CRT) having a display screen with a flat outer surface and a curved inner surface, a 2-layer antistatic and antireflective coating for the display screen's flat outer surface compensates for the variation in screen thickness to provide uniform light transmission through the screen and coating combination, a high degree of video image contrast, effective electrostatic shielding and discharge, and reduced light reflectivity. The coating includes a first inner electrically conductive layer disposed on the CRT display screen's flat outer surface containing carbon black particles for a high level of video image contrast and improved electrical conductivity for electrostatic shielding and discharge. The extent of light transmission through the inner conductive layer may be adjusted in accordance with the display screen's thickness by varying the amount of carbon black particles in the coating solution.

8 Claims, 1 Drawing Sheet

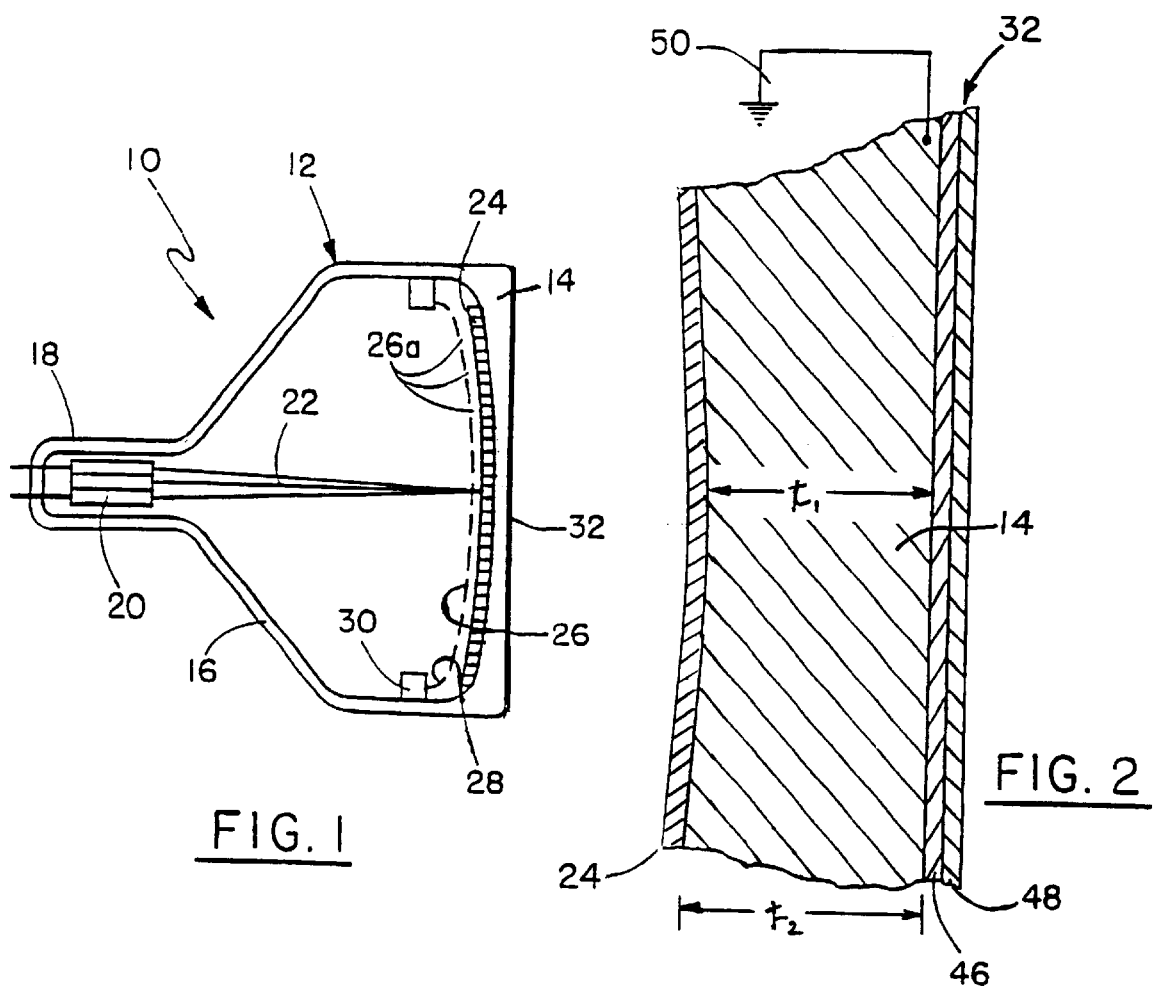

ANTISTATIC/ANTIREFLECTIVE COATING FOR VIDEO DISPLAY SCREEN WITH ADJUSTABLE LIGHT TRANSMISSION

FIELD OF THE INVENTION

This invention relates generally to color cathode ray tubes (CRTs) and is particularly directed to an antistatic/antireflective coating for a color CRT having a display screen with a flat outer surface and a curved inner surface.

BACKGROUND OF THE INVENTION

The glass faceplate of a CRT is comprised of a dielectric material, which operates as a capacitor in storing-up an electrostatic charge as a result of the high voltages applied to the CRT. This electrostatic charge is dissipated to ground for safety reasons. The CRT's display screen, or faceplate, is typically provided with an antistatic coating on a surface thereof for bleeding the charge to ground. The antistatic coating also contributes to safe operation of the CRT by serving as a shield for electromagnetic radiation generated within the CRT. The antistatic coating may take on various forms such as lithium silicates containing conductive ions, semi-conductor materials such as of tin oxides, or hygroscopic materials which include ions which tend to absorb water vapor rendering the material conductive.

The antistatic coating, or layer, may also be provided with an antireflection capability or it may be used with a separate antireflective layer on the glass display screen of the CRT. Reflected light on the display screen makes it more difficult to view a video image produced by the CRT. Various approaches have been developed to reduce the loss of video image contrast due to CRT display screen glare, which is caused by random scattering of reflected light. A common antireflective coating employs negative reflected light interference wherein reflected light coming from the coating surface and the glass surface under the coating cancel each other for minimizing light reflection. A common current approach makes use of an inner layer comprised of an antimony-doped tin oxide (ATO) or indium-doped tin oxide (ITO) solution. The outer antireflective layer is typically comprised of silica.

Most prior CRT display screens are curvilinear in shape and have a generally constant thickness. Light transmission of a video image through the faceplate is generally constant from the faceplate's center to its outer periphery provided that the antistatic/antireflective coating applied to the CRT's display screen is generally uniform in thickness. However, CRTs having a display screen with a flat outer surface are gaining increasing acceptance. In order to ensure accurate positioning of electron beam landing on the CRT's display screen, the inner surface of the display screen is provided with a curvilinear, i.e., generally concave, shape. The thickness of a flat display screen is thus not uniform from its center to its peripheral edges. With the thickness of the display screen increasing from its center to its peripheral edges, light transmission through the display screen varies substantially over the entire surface of the display screen. In order to minimize this light transmission variation through the display screen, the display screen is typically formed of glass having a very high light transmission characteristic. A CRT display screen having a high light transmission characteristic limits the contrast of and reduces the overall quality of the video image presented on the display screen.

The present invention addresses the aforementioned limitations of the prior art by providing an antistatic/antireflective coating particularly adapted for use on the flat glass display screen of a CRT which compensates for variations in light transmission through the display screen to provide a high degree of video image contrast on the display screen.

OBJECTS AND SUMMARY OF THE INVENTION

Accordingly, it is an object of the present invention to provide an antistatic/antireflective coating for the display screen of a cathode ray tube (CRT) with selectably adjustable light transmission for improved video image presentation on the display screen.

It is another object of the present invention to provide an antistatic/antireflective coating particularly adapted for use on CRT glass display screens having a flat outer surface and a concave inner surface which corrects for light transmission variation through the display screen for improved video image presentation.

A further object of the present invention is to provide an optical coating for the surface of a video display screen having a variable thickness which compensates for differences in light transmission through the display screen to provide uniform light transmission for improved video image contrast.

This invention contemplates a coating for use on a flat outer surface of a glass display screen of a self-emitting display device, wherein the glass display screen further includes a concave inner surface with a phosphor coating thereon, wherein light transmission through the display screen varies with the thickness of the display screen and the display screen has a high light transmission coefficient, and wherein the phosphor coating is responsive to energetic electrons incident thereon for providing a video image, the coating comprising: a first inner electrically conductive antistatic layer disposed on the flat outer surface of the glass display screen and including carbon black particles, wherein light transmission through the first inner antistatic layer is adjustable by varying the concentration of the carbon black particles for providing substantially uniform light transmission of the video image through the display screen and first antistatic layer over the entire surface of the display screen; and a second outer antireflective layer disposed on the first inner antistatic layer and having a low light refractive index.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a sectional view of a color cathode ray tube incorporating an antistatic/antireflective coating in accordance with the principles of the present invention; and FIG. 2 is a partial sectional view of FIG. 1 showing an antistatic/antireflective coating applied to the flat outer surface of a display screen of a CRT with accordance in the present invention.

DETAILED DESCRIPTION OF THE PREFERRED EMBODIMENTS

Referring to FIG. 1, there is shown a sectional view of a color CRT having a flat glass faceplate, or display screen 14, and incorporating an antistatic/antireflective coating 32 disposed on the flat, outer surface of the display screen in accordance with the principles of the present invention. In the following discussion the terms "display screen", "display panel" and "faceplate" are used interchangeably. CRT 10 includes a sealed glass envelope 12 having the aforementioned forward, flat display screen 14, an aft neck portion 18, and an intermediate funnel portion 16. Disposed on the inner surface of the glass display screen 14 is a phosphor screen 24 which includes a plurality of discrete phosphor deposits, or elements, which emit light when an electron beam is incident thereon to produce a video image on the display screen. Color CRT 10 further includes three electron beams 22 directed onto and focused upon the CRT's glass display screen 14. Disposed in the neck portion 18 of the CRT's glass envelope 12 are plural electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having plural spaced electron beam passing apertures 26a and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figures for simplicity. The shadow mask mounting fixture 30 is attached to the inner surface of the CRT's glass envelope 12 and the shadow mask 26 is attached to the mounting fixture by conventional means such as weldments or a glass-based frit.

As shown in FIG. 1, the inner surface of the CRT's display screen 14 is generally curvilinear and more specifically has a concave shape to provide highly accurate incident electron beam landing on the display screen. As described above and as shown in FIG. 1, phosphor screen 24 is disposed on the curvilinear surface of the CRT's display screen 14. Discrete phosphor deposits within phosphor screen 24 provide the primary colors of the red, green and blue in response to energetic electrons incident thereon to provide a color video image which is observed by a viewer through the flat, outer surface of the CRT's display panel 14. As shown in FIG. 1, display panel 14 has a reduced thickness along its center axis, with its thickness increasing in proceeding from the display screen's center to its outer periphery. This is more clearly shown in the partial sectional view of the display screen 14 of FIG. 2. As shown in FIG. 2, the thickness of the display screen 14 along its center axis is shown as the dimension $t_1$, while its thickness at a location displaced outwardly from its center axis is represented as dimension $t_2$, where $t_2 > t_1$. It is the difference in thickness of the CRT's display screen in proceeding toward its outer periphery which gives rise to variation in light transmission through the display screen. More specifically, light transmitted through a central portion of the display screen 14 transits a much shorter distance of glass than light transmitted through the display panel adjacent its outer periphery. In order to minimize this light transmission variation from the center to the edges of the CRT's display screen 14, the glass of the display screen is selected so as to have a very high coefficient of light transmission. However, a high coefficient of light transmission typically results in a washed out video image having low contrast.

The present invention addresses this problem encountered in the prior art by providing increased video image contrast on the flat outer surface of the glass display screen of a color CRT. More specifically, the inventive antistatic/antireflective coating 32 is provided with an inner antistatic layer 46 and an outer antireflective layer 48 disposed on the antistatic layer. The antistatic layer 46 is comprised of a solution of carbon black fine powder particles in water for enhanced video image contrast. The extent of light transmission through the antistatic layer 46 is determined by the concentration of the carbon black particles in the water solution. Increasing the carbon particle concentration in the water solution decreases the light transmission through the antistatic layer 46, while reducing the concentration of the conductive carbon black particles increases light transmission through the antistatic layer. The extent of light transmission through the antistatic layer 46 may thus be precisely adjusted to compensate for the nonuniform thickness of the CRT's glass display screen 14 to provide the desired light transmission of the video image through the display screen. The antistatic/antireflective coating combination thus provides optimum video image contrast for the thickness of the CRT's glass display screen 14. The inner antistatic layer 46 further preferably includes indium-doped tin oxide (ITO) particles to provide the required electrical conductivity. The carbon black particles may also be electrically conductive to provide the antistatic layer 46 with an increased level of electric conductivity for directing electrostatic charge on the display screen 14 to neutral ground via a conductor 50. The highly electrically conductive carbon black particles in the antistatic layer 46 also served as an effective electromagnetic shield on the CRT's display screen 14. The weight ratio of the carbon black to the ITO is in the range of 0.1–0.5 (or 10%–50%).

Disposed on the outer surface of the inner antistatic layer 46 is the aforementioned antireflective layer 48. The outer antireflective layer 48 has a low light refractive index and is a solution which preferably contains silica sol.

There has thus been shown an antistatic/antireflective coating for the flat video display screen of a color CRT having an adjustable light transmission characteristic to compensate for the nonuniform thickness of the flat video display screen. The antistatic/antireflective coating includes an inner antistatic layer disposed on the flat outer surface of the display screen and an outer antireflective layer disposed on the antistatic layer. With the flat display screen having increasing thickness in proceeding from its center toward a peripheral edge, the transmission of light through the display screen varies over a wide range. To minimize light transmission variation through the display screen, its glass composition is selected so as to have a very high light transmission characteristic. To avoid a washed out video image because of limited contrast arising from the high degree of light transmission through the display screen, an inner antistatic layer carbon black fine powder particles is deposited on the display screen's flat outer surface. The carbon black particles limit the light transmission through the display screen and antistatic/antireflective coating combination to provide a high degree of contrast for the video image presented on the CRT's flat display screen. Light transmission through the inner antistatic layer may be precisely adjusted by adjusting the concentration of the carbon black particles in the water-based solution to precisely compensate for the CRT display screen's thickness variation from its center to its outer periphery. The inner antistatic layer of the display screen's surface coating also includes indium-doped tin oxide particles for electrical conductivity to provide electromagnetic shielding for the CRT as well as effective discharge of electrostatic charge build-up on the display screen. The carbon black particles may also be electrically conductive to further increase the electromagnetic shielding and electrostatic charge dissipation of the display screen. The outer antireflective layer of the display screen surface coating is comprised of a material having a low light reflective index such as silica sol for reduced light reflection from the surface of the display screen to minimize eye fatigue. While described primarily herein in terms of a coating(s) on the outer surface of the display screen of a CRT, the present invention is not limited to use with this type of display screen, but may also be incorporated on a field emission display, a plasma discharge panel, a vacuum fluorescent screen, or a gas discharge screen.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. For use on a flat outer surface of a glass display screen of a self-emitting display device, wherein said glass display screen further includes a concave inner surface with a phosphor coating thereon, wherein light transmission through the display screen varies with the thickness of the display screen and the display screen has a high light transmission characteristic, and wherein said phosphor coating is responsive to energetic electrons incident thereon for providing a video image, a coating comprising:

a first inner electrically conductive antistatic layer disposed on the flat outer surface of the glass display screen and including carbon black particles, wherein light transmission through said first inner antistatic layer is adjustable by varying the concentration of said carbon black particles for providing substantially uniform light transmission of the video image through the display screen and first antistatic layer over the entire surface of the display screen, wherein said first inner antistatic coating further includes indium-doped tin oxide particles with the weight ratio of said carbon black particles to said indium-doped tin oxide particles being in the range of 31%–50%; and a second outer antireflective layer disposed on said first inner antistatic layer and having a low light refractive index.

2. The coating of claim 1 wherein said carbon black particles are electrically conductive.

3. The coating of claim 1 wherein said second outer antireflective layer is comprised of silica sol.

4. A video apparatus comprising:

a display panel having an outer flat surface, an inner concave surface, and an increasing thickness in proceeding from a center of said display panel to an outer periphery thereof, wherein light transmission through said display panel decreases in proceeding from the center of said display panel to the outer periphery thereof and wherein said display panel has a high light transmission coefficient for reducing variation in light transmission through said display panel; and an antistatic layer disposed on the outer flat surface of said display panel and including carbon black particles for reducing electromagnetic radiation from and dissipating electrostatic charge on said display panel, wherein light transmission through said antistatic layer is adjustable by varying the concentration of said carbon black particles for providing substantially uniform light transmission of a video image through said display panel and antistatic layer combination over the entire surface of said display panel, said antistatic layer further including indium-doped tin oxide particles with the weight ratio of said carbon black particles to said indium-doped tin oxide particles being in the range of 31%–50%.

5. The video apparatus of claim 4 wherein said carbon black particles are electrically conductive.

6. The video apparatus of claim 4 further comprising an antireflective layer disposed on said antistatic layer and having a low light refractive index.

7. The video apparatus of claim 6 wherein said antireflective layer is comprised of silica sol.

8. The video apparatus of claim 4 wherein said display panel is a field emission display, a plasma discharge panel, a vacuum flourescent screen, or a gas discharge screen.

* * * * *